US008100098B2

(12) United States Patent
Takahashi et al.

(10) Patent No.: US 8,100,098 B2
(45) Date of Patent: Jan. 24, 2012

(54) MULTI-LINK ENGINE

(75) Inventors: Naoki Takahashi, Yokohama (JP); Masayuki Tomita, Fujisawa (JP); Kenshi Ushijima, Kamakura (JP); Koji Hiraya, Yokohama (JP); Hirofumi Tsuchida, Yokosuka (JP); Shunichi Aoyama, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 667 days.

(21) Appl. No.: 12/255,390

(22) Filed: Oct. 21, 2008

(65) Prior Publication Data

US 2009/0107453 A1 Apr. 30, 2009

(30) Foreign Application Priority Data

| | | |
|---|---|---|
| Oct. 26, 2007 | (JP) | 2007-279395 |
| Oct. 26, 2007 | (JP) | 2007-279401 |
| Oct. 30, 2007 | (JP) | 2007-281459 |
| Jun. 20, 2008 | (JP) | 2008-161633 |

(51) Int. Cl.

| | |
|---|---|
| ***F02B 75/04*** | (2006.01) |
| ***F02B 75/32*** | (2006.01) |
| ***F02D 15/02*** | (2006.01) |
| ***F16C 7/00*** | (2006.01) |

(52) U.S. Cl. .................. 123/48 B; 123/78 F; 123/197.4

(58) Field of Classification Search ................ 123/48 R, 123/48 B, 78 R, 78 E, 78 F, 197.1, 197.4

See application file for complete search history.

(56) References Cited

U.S. PATENT DOCUMENTS

| | | | |
|---|---|---|---|
| 6,390,035 | B2 | 5/2002 | Moteki et al. |
| 7,363,902 | B2 | 4/2008 | Ushijima et al. |
| 2003/0209213 | A1 | 11/2003 | Moteki et al. |
| 2005/0268870 | A1 | 12/2005 | Hotta et al. |
| 2006/0157016 | A1 | 7/2006 | Ushijima et al. |

FOREIGN PATENT DOCUMENTS

| | | |
|---|---|---|
| JP | 09-228858 | 9/1997 |
| JP | 2001-227367 A | 8/2001 |
| JP | 2001-263114 A | 9/2001 |
| JP | 2002-061501 A | 2/2002 |
| JP | 2003-328796 | 11/2003 |
| JP | 2003-343297 | 12/2003 |

(Continued)

OTHER PUBLICATIONS

An English translation of the Chinese Office Action of corresponding Chinese Application No. 200810173231.7, dated Dec. 4, 2009. The Japanese Office Action of corresponding Japanese Application No. 2007-279395, dated Oct. 25, 2011 and mailed Nov. 1, 2011.
The Japanese Office Action of corresponding Japanese Application No. 2007-279401, dated Oct. 25, 2011 and mailed Nov. 1, 2011.

*Primary Examiner* — Noah Kamen
(74) *Attorney, Agent, or Firm* — Global IP Counselors, LLP

(57) ABSTRACT

A multi-link engine has a piston coupled to a crankshaft to move inside an engine cylinder. A piston pin connects the piston to an upper link, which is connected to a lower link by an upper link pin. A crank pin of the crankshaft rotatably supports the lower link thereon. A control link pin connects the lower link to one end of a control link, which is connected at another end to the engine block body by a control shaft. The upper link has an upper link axis that forms an angle with the cylinder axis, as viewed along a crank axis direction of the crankshaft, such that the angle reaches a minimum when a crank angle of the engine is within a range where the bottom end of a piston skirt is positioned below a topmost part of the bottom end of the cylinder liner.

11 Claims, 11 Drawing Sheets

FOREIGN PATENT DOCUMENTS

| | | | |
|---|---|---|---|
| JP | 2004-060551 | | 2/2004 |
| JP | 2004-156538 | | 6/2004 |
| JP | 2005-069027 | | 3/2005 |
| JP | 2005-147068 | A | 6/2005 |
| JP | 2005-163740 | A | 6/2005 |
| JP | 2006-052667 | | 2/2006 |
| JP | 2006-161571 | | 6/2006 |
| JP | 2006-183595 | A | 7/2006 |

MULTI-LINK ENGINE

CROSS-REFERENCE TO RELATED APPLICATIONS

This application claims priority to Japanese Patent Application No. 2007-279395, filed on Oct. 26, 2007, 2007-279401, filed on Oct. 26, 2007, 2007-281459, filed on Oct. 30, 2007 and 2008-161633, filed on Jun. 20, 2008. The entire disclosures of Japanese Patent Application Nos. 2007-279395, 2007-279401, 2007-281459 and 2008-161633 are hereby incorporated herein by reference.

BACKGROUND OF THE INVENTION

1. Field of the Invention

The present invention generally relates to a multi-link engine. More specifically, the present invention relates to a link geometry for a multi-link engine.

2. Background Information

Engines have been developed in which a piston pin and a crank pin are connected by a plurality of links (such engines are hereinafter called multi-link engines). For example, a multi-link engine is disclosed in Japanese Laid-Open Patent Publication No. 2002-61501. A multi-link engine is provided with an upper link, a lower link and a control link. The upper link is connected to a piston, which moves reciprocally inside a cylinder by a piston pin. The lower link is rotatably attached to a crank pin of a crankshaft and connected to the upper link with an upper link pin. The control link is connected to the lower link with a control link pin for rocking about a rocking center pin.

An engine in which the piston and crankshaft are connected by single link (i.e., a connecting rod) is a common engine that is referred to hereinafter as a “single-link engine” in contrast to a multi-link engine. A distinctive characteristic of a multi-link engine is that it enables a long stroke to be obtained without increasing the top deck height (overall height), which is not possible in an engine having one link (i.e., connecting rod) connected between the piston and the crank shaft (an engine with one link is a normal engine but hereinafter will be referred to as a “single-link engine”). Technologies utilizing this characteristic are being researched, such as in Japanese Laid-Open Patent Publication No. 2006-183595.

In Japanese Laid-Open Patent Application No. 2006-183595, a sliding part of a piston (piston skirt) is formed with a minimal amount that is necessary. Additionally, the cylinder liner of the cylinder block is provided with a cutout such that a counterweight of the crankshaft and a link component can pass through the cutout of the cylinder liner. In this way, the position of a bottom end of the cylinder liner and the bottom dead center position of the piston can be lowered and a longer stroke can be achieved without increasing the overall height of the engine. Other related patent documents include Japanese Laid-Open Patent Publication No. 2001-227367 and Japanese Laid-Open Patent Publication No. 2005-147068

In view of the above, it will be apparent to those skilled in the art from this disclosure that there exists a need for an improved multi-link engine. This invention addresses this need in the art as well as other needs, which will become apparent to those skilled in the art from this disclosure.

SUMMARY OF THE INVENTION

It has been discovered that when a cutout is formed in the bottom end of the cylinder liner as described above, the rigidity of the cylinder liner is weakened in the vicinity of the cutout. Meanwhile, the surface pressure applied to the cylinder liner is higher in the vicinity of the cutout because the surface area of the cylinder liner is smaller in the vicinity of the cutout. Consequently, there is the possibility that the cylinder liner will undergo deformation or the contact state between the cylinder liner and the piston skirt will be degraded when the piston experiences a large thrust load. Also, when the piston experiences a large thrust load, there is the possibility that an edge of the cutout of the cylinder liner will cause a film of lubricating oil on the piston skirt to be scraped off.

The present invention was conceived in view of these problems. Object is to provide a link geometry for a multi-link engine that prevents deformation of the cylinder liner from occurring even when the rigidity of the cylinder liner has been weakened by removing a portion of the bottom end of the cylinder liner.

In view of the above, a multi-link engine is provided that basically comprises an engine block body, a crankshaft, a piston, an upper link, a lower link and a control link. The engine block body includes at least one cylinder with a cylinder liner formed so that a bottom end position in the direction of a cylinder axis is not constant and at least part of the bottom end has different positions. The crankshaft includes a crank pin. The piston is operatively coupled to the crankshaft to reciprocally move inside the cylinder of the engine. The upper link is rotatably connected to the piston by a piston pin. The lower link is rotatably connected to the crank pin of the crankshaft and is rotatably connected to the upper link by an upper link pin. The control link is rotatably connected at one end to the lower link by a control link pin and rotatably connected at another end to the engine block body by a control shaft. The upper link has an upper link axis that forms an angle with the cylinder axis, as viewed along a crank axis direction of the crankshaft, such that the angle reaches a minimum when a crank angle of the engine is within a range where the bottom end of a piston skirt is positioned below a topmost part of the bottom end of the cylinder liner.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
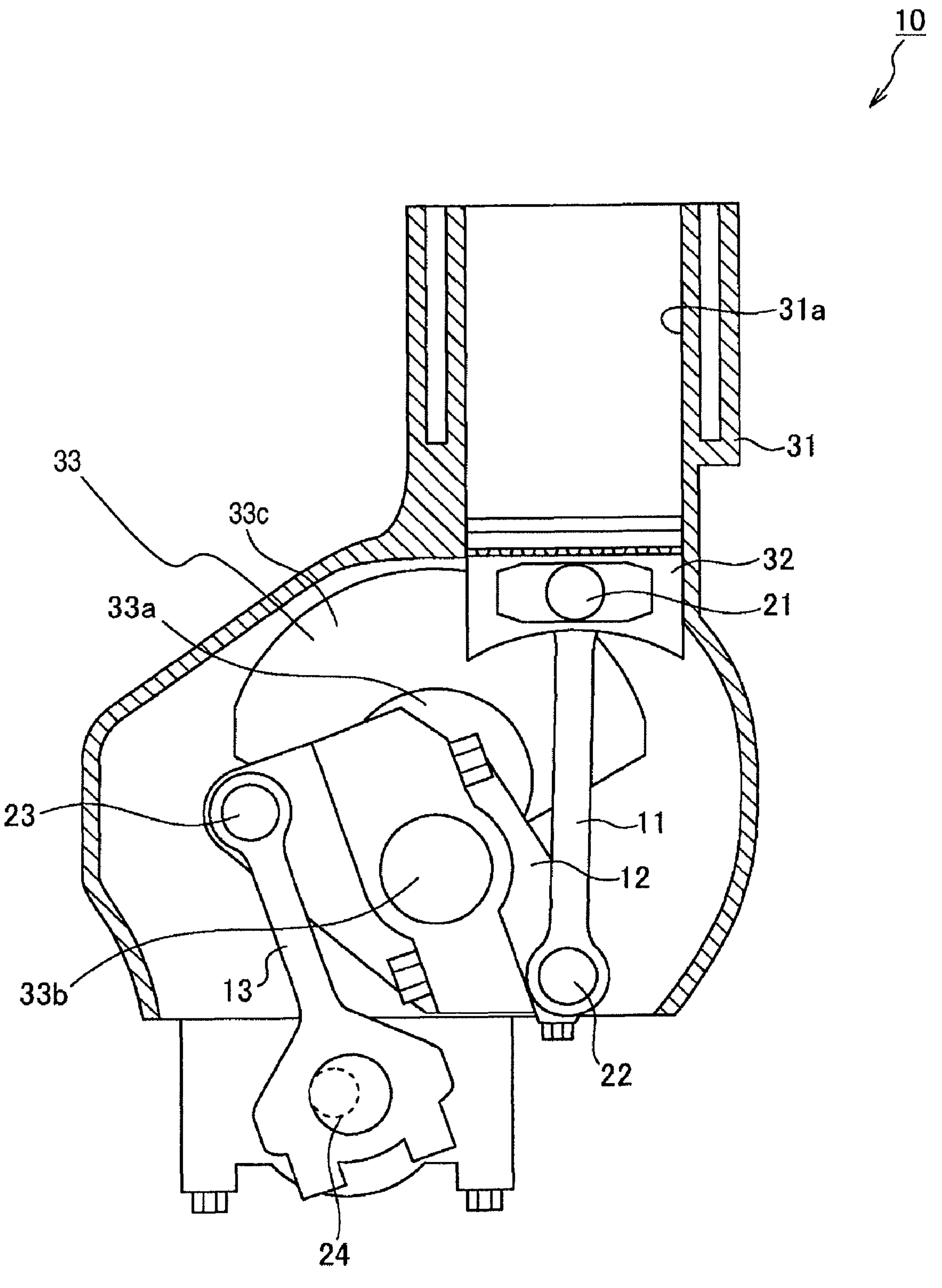
FIG. 1 is a vertical cross sectional view of a multi-link engine in accordance with one embodiment.

Referring initially to FIG. 1, selected portions of a multi-link engine 10 is illustrated in accordance with a preferred embodiment. The multi-link engine 10 has a plurality of cylinder. However, only one cylinder will be illustrated herein for the sake of brevity. The multi-link engine 10 includes, among other things, a linkage for each cylinder having an upper link 11, a lower link 12 connected to the upper link 11 and a control link 13 connected to the lower link 12. The multi-link engine 10 also includes a piston 32 for each cylinder and a crankshaft 33, which are connected by the upper and lower links 11 and 12.

In FIG. 1, the piston 32 of the multi-link engine is illustrated at bottom dead center. FIG. 1 is a cross sectional view taken along an axial direction of the crankshaft 33 of the engine 10. Among those skilled in the engine field, it is customary to use the expressions "top dead center" and "bottom dead center" irrespective of the direction of gravity. In horizontally opposed engines (flat engine) and other similar engines, top dead center and bottom dead center do not necessarily correspond to the top and bottom of the engine, respectively, in terms of the direction of gravity. Furthermore, if the engine is inverted, it is possible for top dead center to correspond to the bottom or downward direction in terms of the direction of gravity and bottom dead center to correspond to the top or upward direction in terms of the direction of gravity. However, in this specification, common practice is observed and the direction corresponding to top dead center is referred to as the "upward direction" or "top" and the direction corresponding to bottom dead center is referred to as the "downward direction" or "bottom."

Now the linkage of the multi-link engine 10, will be described in more detail. An upper end of the upper link 11 is connected to the piston 32 by a piston pin 21, while a lower end of the upper link 11 is connected to one end of the lower link 12 by an upper link pin 22. The piston 32 moves reciprocally inside a cylinder liner 31*a* of a cylinder block 31 in response to combustion pressure. In this embodiment, as shown in FIG. 1, the upper link 11 adopts an orientation substantially parallel to a center axis of the cylinder liner 31*a* and a bottommost portion of the piston 32 is positioned below a bottommost portion of a bottom end of the cylinder liner 31*a* when the piston 32 is at bottom dead center.

Referring FIG. 1, the crankshaft 33 is provided with a plurality of crank journals 33*a*, a plurality of crank pins 33*b* and a plurality of counterweights 33*c*. The crank journals 33*a* are rotatably supported by the cylinder block 31 and a ladder frame. The crank pin 33*b* for each cylinder is eccentric relative to the crank journals 33*a* by a prescribed amount and the lower link 12 is rotatably connected to the crank pin 33*b*. The lower link 12 has a bearing hole located in its approximate middle. The crank pin 33*b* of the crankshaft 33 is disposed in the bearing hole of the lower link 12 such that the lower link 12 rotates about the crank pin 33*b*. The lower link 12 is constructed such that it can be divided into a left member and a right member (two members). One end of the lower link 12 is connected to the upper link 11 with the upper link pin 22 and the other end of the lower link 12 is connected to the control link 13 with a control link pin 23.

Figure 2A:
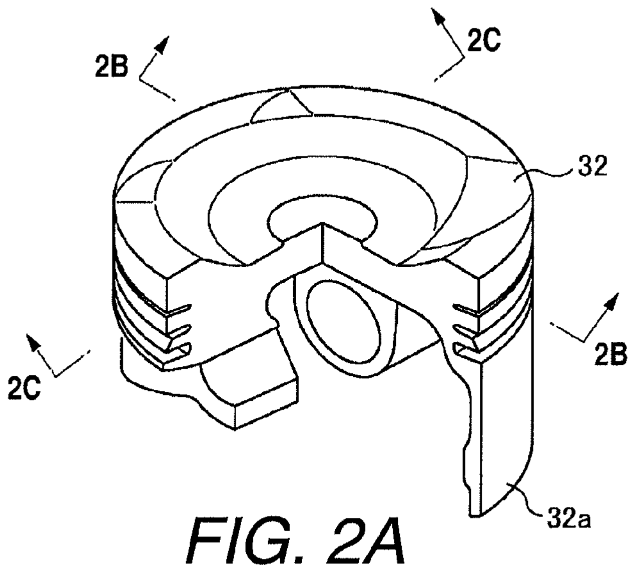
FIG. 2A is a partial perspective view of a piston of the multi-link engine illustrated in FIG. 1.
Figure 2B:
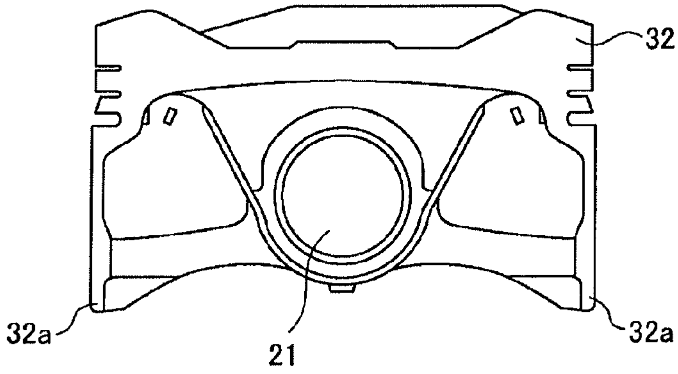
FIG. 2B is a cross sectional view of the piston illustrated in FIG. 2A as seen along section line 2B-2B of FIG. 2A.
Figure 2C:
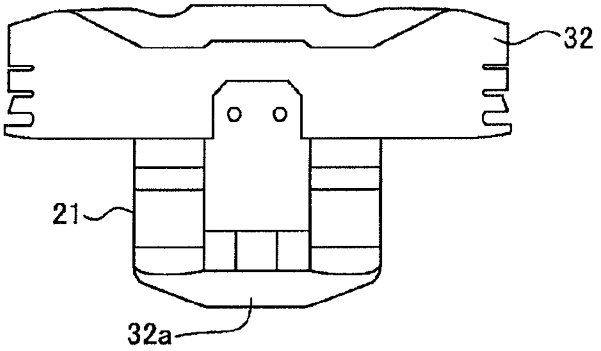
FIG. 2C is a cross sectional view of the piston illustrated in FIG. 2A as seen along section line 2C-2C of FIG. 2A.
Figure 3B:
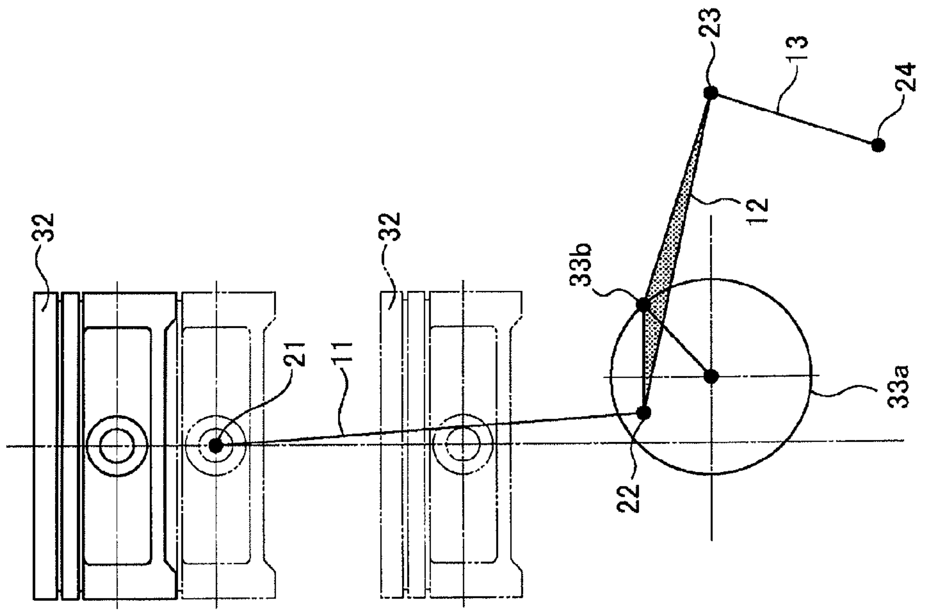
FIG. 3B is a diagrammatic view of the piston to illustrate the behavior of the piston.
Figure 3A:
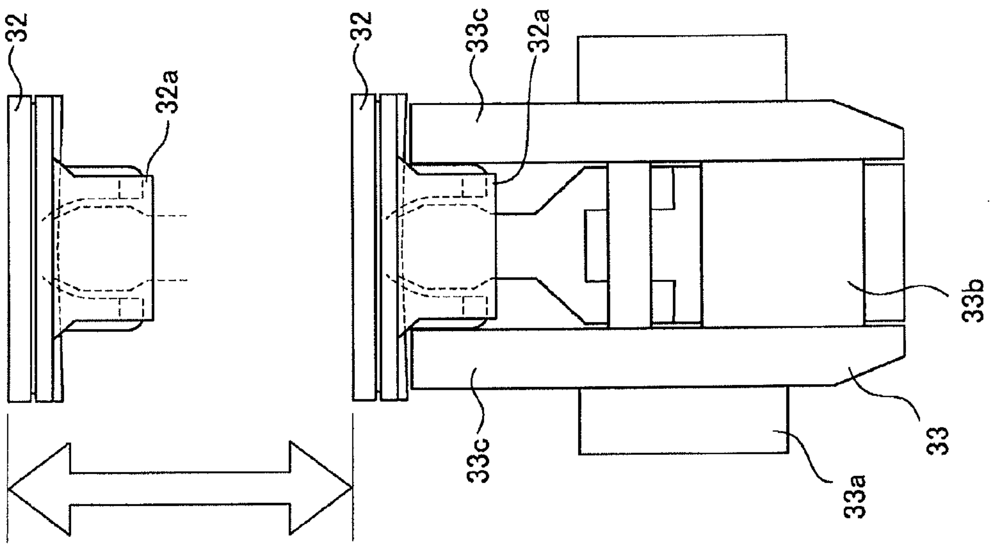
FIG. 3A is a diagrammatic view of the piston to illustrate the behavior of the piston.

The piston 32 will be described herein with reference to FIGS. 2A to 3B. The piston 32 is designed so that a piston skirt 32*a* remains in the lengthwise center portion of the piston pin 21, but there is no piston skirt on the sides of the piston pin 21, as shown in FIG. 2C. According to this structure of the piston 32, the counterweights 33*c* passes on the sides of the piston pin 21 (the piston skirt 32*a*) when the piston 32 is at the bottom dead center as shown in FIG. 3A. Therefore, the length of the upper link 11 is minimized and the bottom dead center position of the piston 32 is brought as close as possible to the crankshaft 33, whereby the piston stroke can be enlarged proportionately. The side thrust force created by the tilt of the upper link 11 is primarily borne by the remaining piston skirt 32*a*.

Figure 4A:
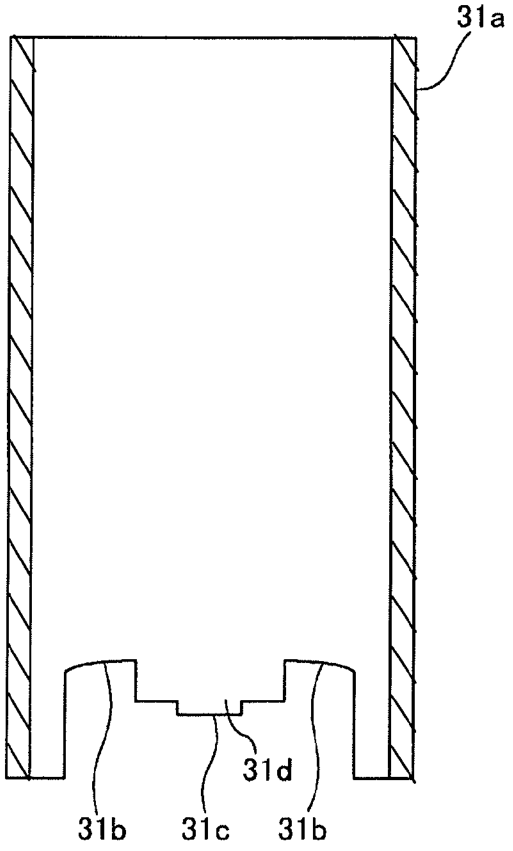
FIG. 4A is a longitudinal cross sectional view of a cylinder liner for the multi-link engine illustrated in FIG. 1 showing a left-hand internal surface of the cylinder liner as viewed from the center axis of the cylinder.
Figure 4B:
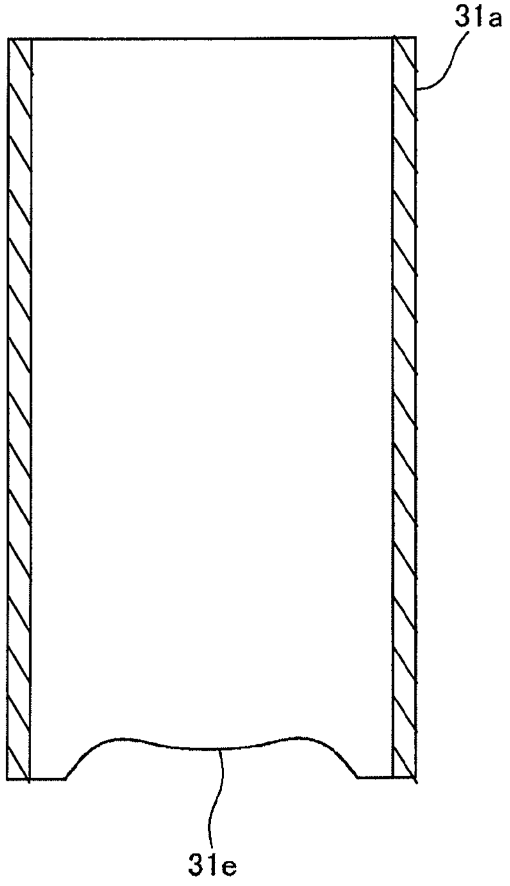
FIG. 4B is a longitudinal cross sectional view of the cylinder liner for the multi-link engine illustrated in FIG. 1 showing a right-hand internal surface of the cylinder liner as viewed from the center axis of the cylinder.

Next, the cylinder liner 31*a* will be described with reference to FIGS. 4A and 4B. FIG. 4A is a longitudinal cross-sectional view of the left inside surface of the cylinder liner 31*a*, as seen from the cylinder axis. FIG. 4B is a longitudinal cross-sectional view of the right inside surface of the cylinder liner 31*a*, as seen from the cylinder axis.

As can be determined from FIG. 1, the crankshaft 33 and the lower link 12 pass through in the vicinity of the bottom end of the cylinder liner 31*a* on the left side in FIG. 1. Therefore, a cutout 31*b* is formed in the bottom end of the cylinder liner 31*a* on the left inner side for allowing the counterweight 33*c* of the crankshaft 33 to pass through, as shown in FIG. 4A. Also a cutout 31*c* is formed in the bottom end of the cylinder liner 31*a* on the left inner side for allowing the lower link 12 to pass through, as shown in FIG. 4A. Therefore, the position of the bottom end of the cylinder liner 31*a* in the axial direction of the cylinder is variable rather than constant. In the illustrated embodiment, the cutout 31*b* is formed deeper than the cutout 31*c*, and the cutout 31*b* is level with the highest part of the bottom end of the cylinder liner 31*a*. The remaining portions of the cutout 31*b* and the cutout 31*c* constitute a remainder part 31*d*.

The upper link 11 passes through the vicinity of the bottom end of the cylinder liner 31*a* on the right side in FIG. 1. Therefore, a cutout 31*e* is formed in the bottom end of the right inner side of the cylinder liner 31*a* for allowing the upper link 11 to pass through, as shown in FIG. 4B. The position of the bottom end of the cylinder liner 31*a* in the axial direction of the cylinder is therefore variable rather than constant.

Returning to FIG. 1, the control link pin 23 is inserted through the distal end of the control link 13, which is turnably connected to the lower link 12. The control link 13 is connected at the other end to the cylinder block 31 via a control shaft 24. The control link 13 oscillates around the control shaft 24. Part of the control shaft 24 is made to be eccentric, and the eccentric position of the control shaft 24 is moved as an eccentric axis, thereby changing the oscillation or rocking center of the control link 13 and the top dead center position of the piston 32, as shown in the drawing. It is thereby possible to mechanically adjust the compression ratio of the engine.

Figure 5A:
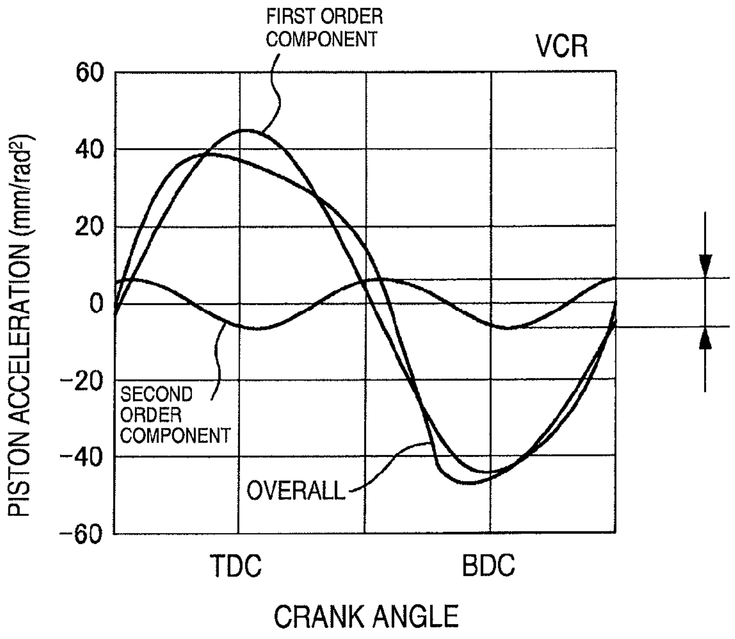
FIG. 5A is a graph that plots the piston acceleration versus the crank angle for explaining a piston acceleration characteristic of a variable compression ratio (VCR) multi-link engine.
Figure 5B:
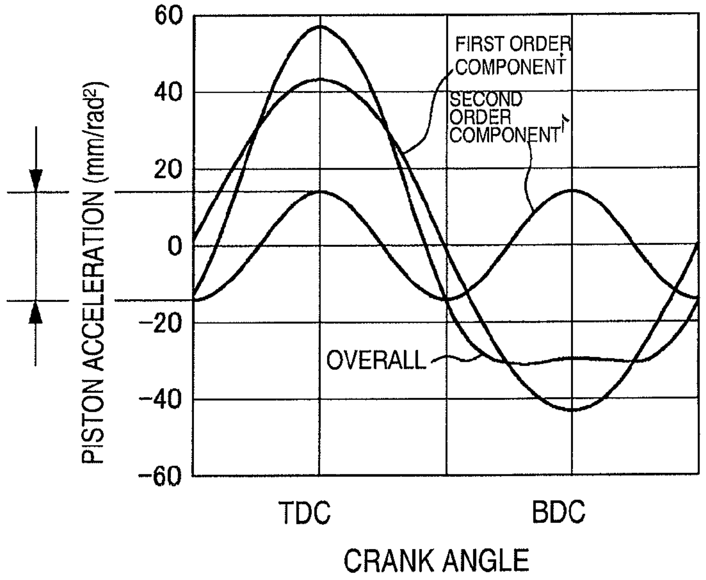
FIG. 5B is a graph that plots the piston acceleration versus the crank angle for explaining a piston acceleration characteristic of a conventional single-link engine.

According to analysis, a multi-link engine can be made to have a lower degree of vibration than a single-link engine by adjusting the position of the control shaft appropriately. The results of the analysis are shown in FIGS. 5A and 5B shows diagrams comparing the piston acceleration characteristics for a multi-link engine to a single-link engine. FIG. 5A is a plot of piston acceleration characteristic curves versus the crank angle for a multi-link engine. FIG. 5B is a plot of piston acceleration characteristic curves versus the crank angle for a single-link engine as a comparative example. This is a comparison with a common single-link engine in which the ratio of the connecting rod length to the stroke is about 1.5 to 3. Assuming the upper link of the multi-link engine is equivalent to the connecting rod of the single-link engine, the comparison is made under the conditions that the stroke lengths are the same and that the upper link of the multi-link engine has the same length as the connecting rod of the single-link engine.

As shown in FIG. 5B, with the single-link engine, the magnitude (absolute value) of the overall piston acceleration obtained by combining a first order component and a second order component is small in a vicinity of bottom dead center than in a vicinity of top dead center. Conversely, as shown in FIG. 5A, with the multi-link engine the magnitude (absolute value) of the overall piston acceleration is substantially the same at both bottom dead center and top dead center. Additionally, the magnitude of the second order component is smaller in the case of the multi-link engine than in the case of the single-link engine. Therefore, a characteristic of the multi-link engine is that second-order vibration can be reduced.

Figure 6A:
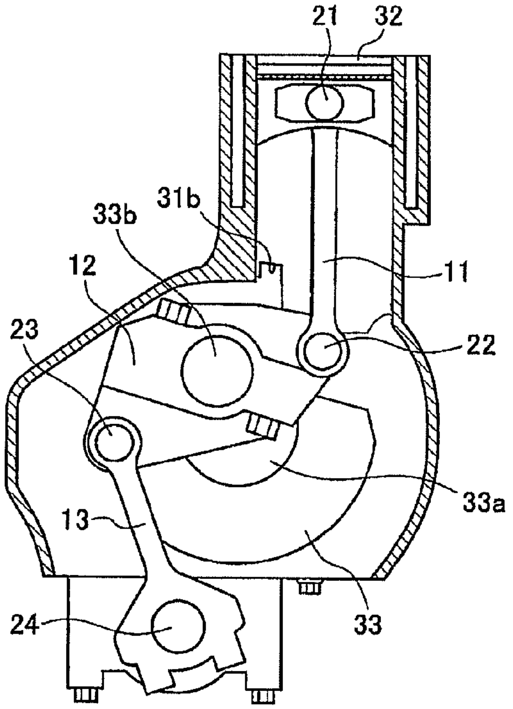
FIG. 6A is a longitudinal cross sectional view of the multi-link engine illustrated in FIG. 1 where the piston is at top dead center.
Figure 6B:
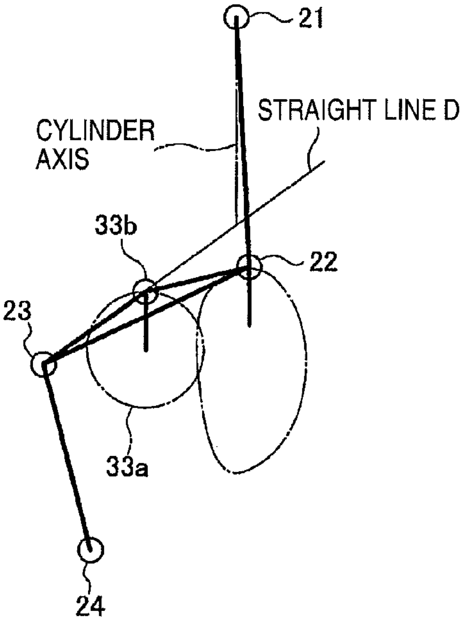
FIG. 6B is a link diagram of the multi-link engine illustrated in FIG. 6A where the piston is at top dead center.

Next, referring to FIG. 6, the link geometry of the multi-link engine of the illustrated embodiment will be described in further detail. The substantially elliptical shapes indicated by the single-dotted lines in FIGS. 6B and 6D are the movement loci of the axis of the upper link pin 22.

Figure 6C:
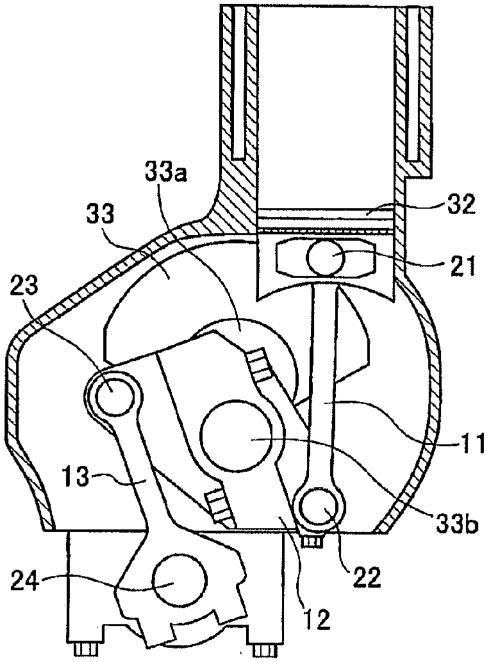
FIG. 6C is a cross sectional view of the multi-link engine illustrated in FIG. 1 where the piston is at bottom dead center.

In the illustrated embodiment, when the piston 32 is at the bottom dead center as shown in FIG. 6C, the bottom end of the piston skirt 32*a* is positioned below the topmost part 31*b* of the bottom end of the cylinder liner 31*a*. The positional relationship between the cylinder bore and the piston 32 in the vicinity of the bottom dead center at this time is shown in FIG. 7. FIG. 7 is a perspective view of the vicinity of the piston, with the cylinder liner is depicted by the single-dotted line. The piston 32 is lowered at this time to a position where the remaining piston skirt 32*a* is lower than the topmost part 31*b* of the bottom end of the cylinder liner. Formed in the bottom part of the cylinder liner 31*a* are the cutouts 31*b* for allowing the counterweights 33*c* of the crankshaft 33 to pass through, and the cutout 31*c* for allowing the lower link 12 to pass through, as described above. Since the cutouts 31*b* and 31*c* are formed in this manner, the cylinder liner remainder part 31*d* has lower strength. Furthermore, the surface pressure applied to the cylinder liner remainder part 31*d* increases in proportion to the decrease in the surface area of the cylinder liner remainder part 31*d* (decrease in the equivalent piston skirt). Therefore, when the thrust load of the piston 32 is considerable, there is a possibility that the cylinder liner (remainder part 31*d*) will deform and that the state of contact between the cylinder liner 31*a* and the piston skirt 32*a* will be compromised. Also, when the thrust load of the piston 32 is considerable, there is a possibility that the lubricating oil film on the piston skirt 32*a* will be scraped off by the edges of the cutouts 31*b* and 31*c* of the cylinder liner 31*a*. In view of this, the illustrated embodiment is designed so that the axis of the upper link 11 (an imaginary straight line that joins a center of the piston pin 21 with a center of the upper link pin 22) and the axis of the cylinder are made parallel at this time. That is to say, the angle formed by the axis of the upper link 11 and the axis of the cylinder is kept at zero degrees, which is the minimum amount, when the crank angle is within a range where the bottom end of the piston skirt 32*a* is positioned below the topmost part 31*b* of the bottom end of the cylinder liner 31*a*, as shown in FIG. 6D. Therefore, the thrust force applied from the piston 32 to the cylinder liner 31*a* is small, and deformation of the cylinder liner 31*a* can be effectively suppressed even if cutouts 31*b* and 31*c* are formed in the cylinder liner 31*a*. Particularly, the thrust force applied from the piston 32 to the cylinder liner 31*a* is at a minimum when the angle formed by the axis of the upper link 11 and the axis of the cylinder is at a minimum, as seen from the crank axial direction. When the bottom end of the piston skirt is positioned below the topmost part 31*b* of the bottom end of the cylinder liner 31*a*, the result of such a state is that no deformation occurs in the cylinder liner 31*a* even if cutouts are formed in the cylinder liner 31*a*. When the piston 32 is at the bottom dead center, the bottommost part of the piston 32 is positioned below the bottommost part of the bottom end of the cylinder liner 31*a*, but since the thrust force applied from the piston 32 to the cylinder liner 31*a* is small, it is possible to prevent the lubricating oil film on the piston skirt from being scraped off by the edges of the cutouts in the cylinder liner 31*a*.

Figure 6D:
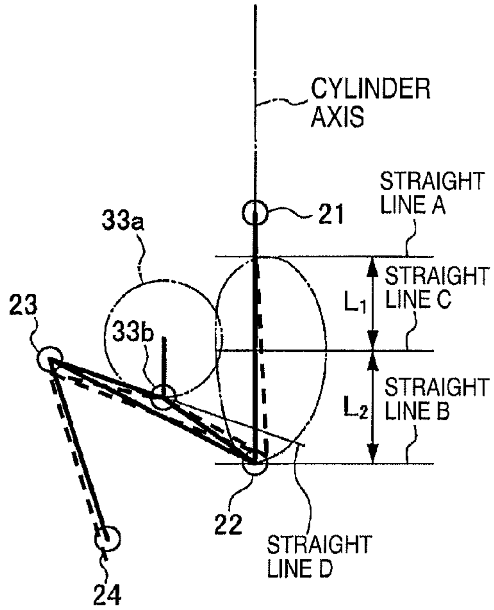
FIG. 6D is a link diagram of the multi-link engine illustrated in FIG. 6C where the piston is at bottom dead center.
Figure 7:
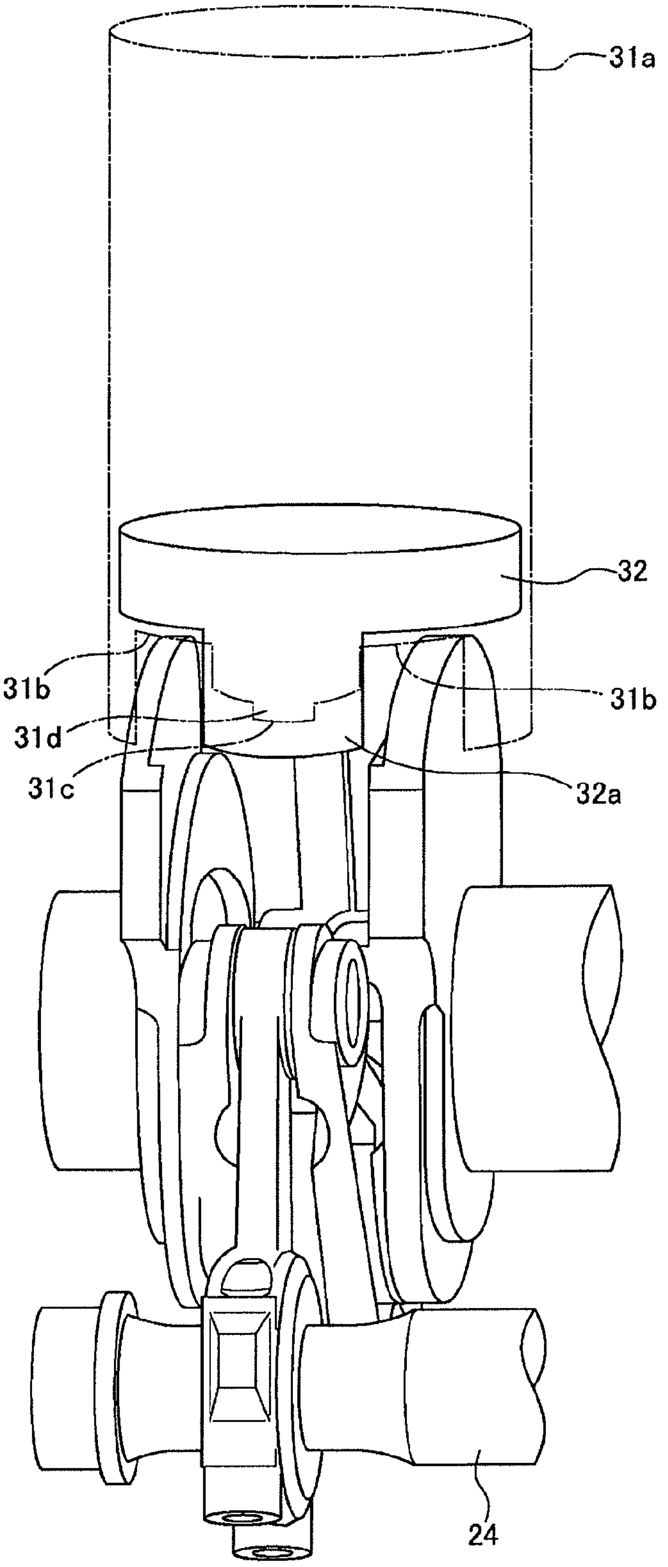
FIG. 7 is a perspective view of selected parts of the multi-link engine in the vicinity of the piston, as viewed perpendicularly to the crankshaft from the left side of the crankshaft as seen in FIG. 6C.

The curvature radius of the movement locus of the axial center of the upper link pin 22 is smaller in the vicinity of the piston bottom dead center than in the vicinity of the piston top dead center, as shown in FIG. 6D. In other words, the distance L1 from straight line A to straight line C is less than the distance L2 from straight line B to straight line C, where A is a straight line orthogonal to the cylinder axis and tangent to an area in the vicinity of the top end of the elliptical axial locus of the upper link pin 22, B is a straight line orthogonal to the cylinder axis and tangent to an area in the vicinity of the bottom end of the elliptical locus, and C is a straight line which intersects the elliptical locus at two points, which is orthogonal to the cylinder axis, and along which the distance between the two points of intersection reaches a maximum.

The axial center of the upper link pin 22 is positioned below the straight line D that joins the axial center of the control link pin 23 and the axial center of the crank pins 33*b*. If the axial center of the upper link pin 22, the axial center of the control link pin 23, and the axial center of the crank pins 33*b* all lie along one straight line, the axial center of the upper link pin 22 is positioned on the straight line D that joins the axial center of the control link pin 23 and the axial center of the crank pins 33*b*.

Figure 8A:
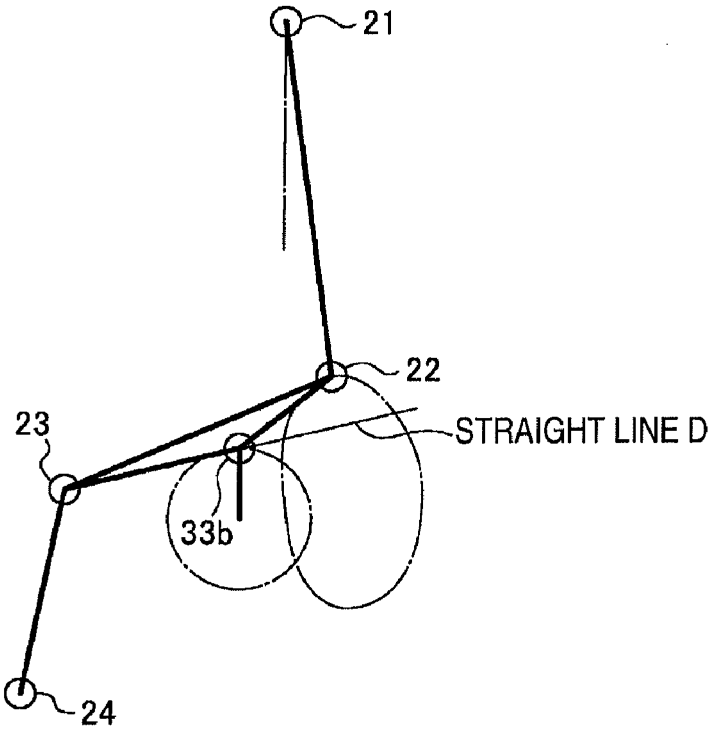
FIG. 8A is a link diagram of a comparative example where the piston is at top dead center.
Figure 8B:
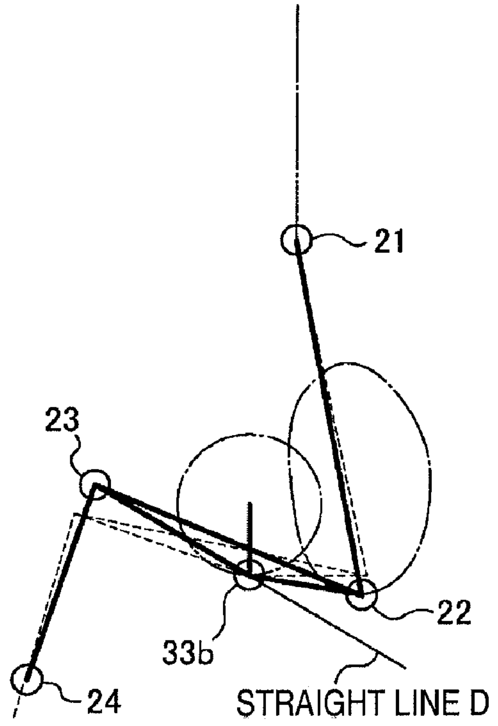
FIG. 8B is a link diagram of a comparative example where the piston is at bottom dead center.

A case is herein considered in which the axial center of the upper link pin 22 is positioned above the straight line D that joins the axial center of the control link pin 23 and the axial center of the crank pins 33*b*, as shown in the comparative example in FIG. 8. When the control shaft 24 is positioned to the lower left of the crankshaft center, and the control link pin is positioned to the left of the crank axial center (when the cylinder center line is positioned vertically in the drawing), the position of the upper link pin 22 is higher than in the case shown in FIG. 6, regardless of whether the piston 32 is in the vicinity of the top dead center (FIG. 8A) or in the vicinity of the bottom dead center (FIG. 8B). Therefore, positioning the axial center of the upper link pin 22 below the straight line D makes it easier to lengthen the stroke without increasing the top deck height (overall height).

As described above, by making the control shaft 24 as an eccentric shaft and moving the position of the eccentric position of the control shaft 24 with respect to the pivot axis of the control shaft 24, the oscillation or rocking center of the control link 13, and thus, the top dead center position of the piston 32 can be changed. In this way, the compression ratio can be mechanically adjusted. The geometry is set at this time so that the minimum angle formed by the axis of the upper link 11 and the cylinder axis is smaller at a low compression ratio than at a high compression ratio. In FIG. 6D, the solid lines indicate a low compression ratio, and the dashed lines indicate a high compression ratio. Under high load conditions, it is preferable to set the compression ratio low in accordance with the operating conditions in order to ensure the desired output. Under low load conditions, it is preferable to set the compression ratio high so that exhaust loss is reduced by increasing expansion work. In cases in which the compression ratio is set in this manner, combustion pressure is increased and the side thrust force is greater during low load conditions. According to the illustrated embodiment, deformation of the cylinder liner 31*a* can be more effectively suppressed even in these cases.

Moreover, since the multi-link engine 1 is a variable compression ratio engine, the point where the minimum angle formed between the upper link axis of the upper link 11 and the cylinder axis can vary depending on the position of the eccentric position of the control shaft 24. Thus, the minimum angle formed between the upper link axis of the upper link and the cylinder axis can occur within a prescribed ranged that includes when the piston 32 is at bottom dead center, when the piston 32 is just before bottom dead center and when the piston 32 is just after bottom dead center.

Figure 9A:
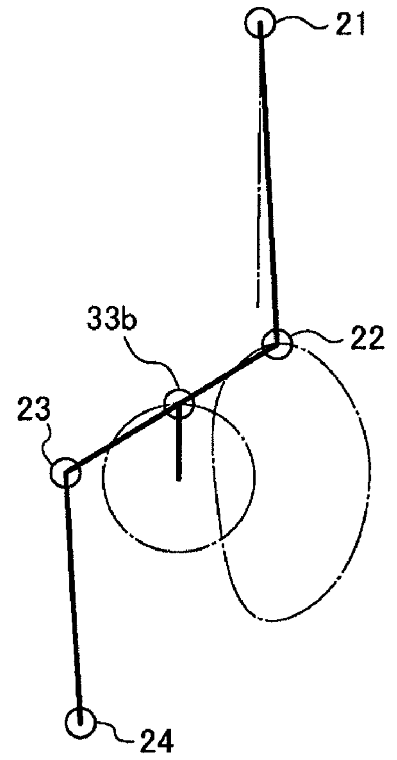
FIG. 9A is a link diagram of a multi-link engine in accordance with a second embodiment of a link geometry where the piston is at top dead center.
Figure 9B:
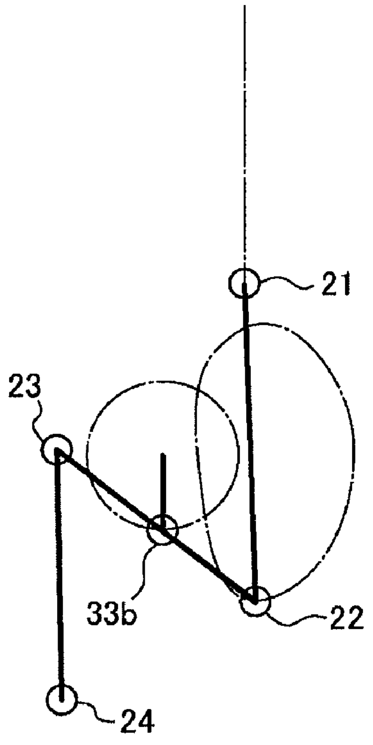
FIG. 9B is a link diagram of the multi-link engine in accordance with the second embodiment of the link geometry where the piston is at bottom dead center.

FIGS. 9A and 9B diagrammatically illustrate a link geometry of a multi-link engine according to a second embodiment. The first embodiment described above was designed so that the axial center of the upper link pin 22 was positioned below a straight line D that joins the axial center of the control link pin 23 and the axial center of the crank pins 33*b*. On the other hand, the second embodiment is designed so that the axial center of the upper link pin 22, the axial center of the control link pin 23, and the axial center of the crank pins 33*b* are disposed along one straight line, and the axial center of the upper link pin 22 is positioned above the straight line D that joins the axial center of the control link pin 23 and the axial center of the crank pins 33*b*. Thus, the position of the upper link pin 22 can be lowered regardless of whether the piston 32 is in the vicinity of the top dead center or in the vicinity of the bottom dead center, in comparison with the comparative example in FIGS. 8A and 8B. Therefore, even if the axial center of the upper link pin 22 is positioned on the straight line D, the stroke can be lengthened without increasing the top deck height (overall height).

FIG. 10 diagrammatically illustrate a link geometry of a multi-link engine according to a third embodiment. In the first embodiment described above, the movement locus of the axial center of the upper link pin 22 was aligned with the cylinder axis. On the other hand, the third embodiment is a case in which the movement locus of the axial center of the upper link pin 22 is in a position displaced from the cylinder axis.

Figure 10A:
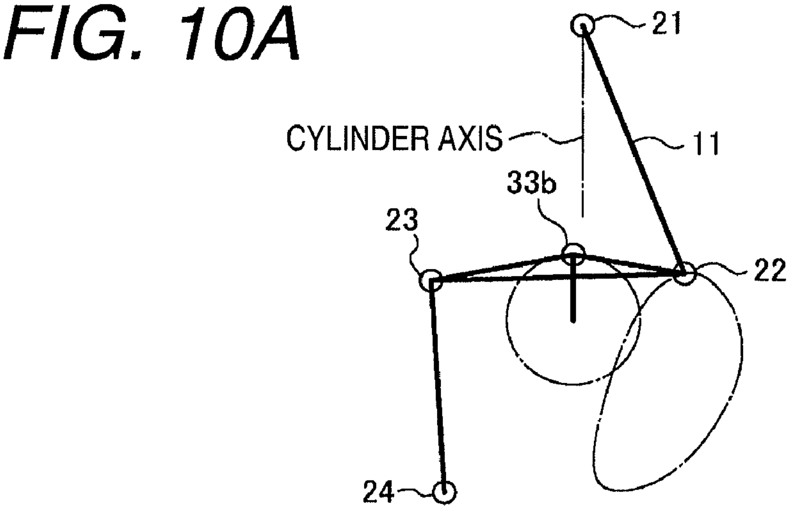
FIG. 10A is a link diagram of a multi-link engine in accordance with a third embodiment of a link geometry where the piston is at top dead center.
Figure 10B:
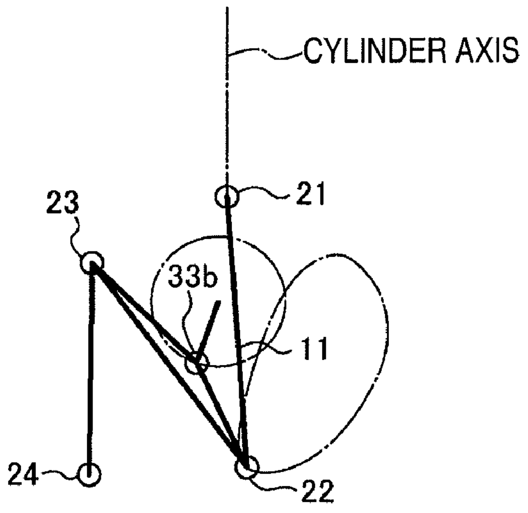
FIG. 10B is a link diagram of the multi-link engine in accordance with the third embodiment of the link geometry where the piston is at bottom dead center.
Figure 10C:
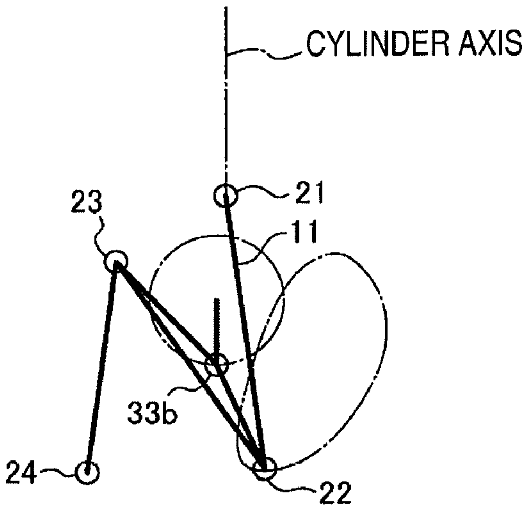
FIG. 10C is a link diagram of the multi-link engine in accordance with the third embodiment of the link geometry where the piston is at bottom dead center with the position of the control shaft changed.

In this case, the movement locus of the axial center of the upper link pin 22 has a shape inclined to the right, as shown in FIGS. 10A to 10C. The axial center of the upper link pin 22 reaches the left end of the movement locus while the piston is moving from the top dead center (FIG. 10A) to the bottom dead center (FIG. 10C), at which time the angle formed by the axis of the upper link 11 and the cylinder axis reaches a minimum (FIG. 10B). In the illustrated embodiment, the bottom end of the piston skirt is positioned below the topmost part 31*b* of the bottom end of the cylinder liner 31*a* at this time.

Thus, the illustrated embodiment is designed so that at the time when the angle formed by the axis of the upper link 11 and the cylinder axis reaches a minimum, the bottom end of the piston skirt is positioned below the topmost part 31*b* of the bottom end of the cylinder liner 31*a*. Therefore, the thrust force applied from the piston 32 to the cylinder liner 31*a* can be reduced even in cases in which the movement locus of the axial center of the upper link pin 22 is in a position that is offset from the cylinder axis, and no deformation occurs in the cylinder liner 31*a* even if cutouts are formed in the cylinder liner 31*a*.

As described above, by making the control shaft 24 as an eccentric shaft and moving the position of the eccentric position of the control shaft 24 with respect to the pivot axis of the control shaft 24, the oscillation or rocking center of the control link 13, and the top dead center position of the piston 32 can be changed. In this way, the compression ratio can be mechanically adjusted. The minimum angle formed by the axis of the upper link 11 and the cylinder axis at this time is less at a low compression ratio than at a high compression ratio.

Figure 11A:
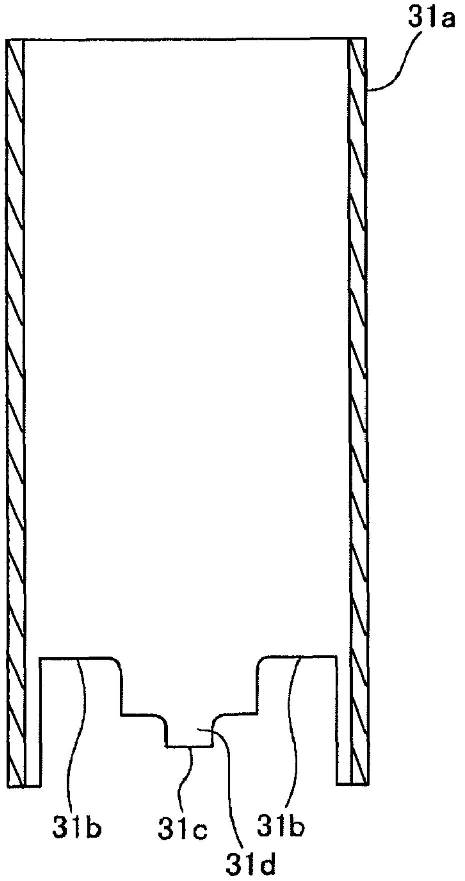
FIG. 11A is a longitudinal cross sectional view of another center liner for a multi-link engine illustrated in FIG. 1 showing a left-hand internal surface of the cylinder liner as viewed from the center axis of the cylinder.
Figure 11B:
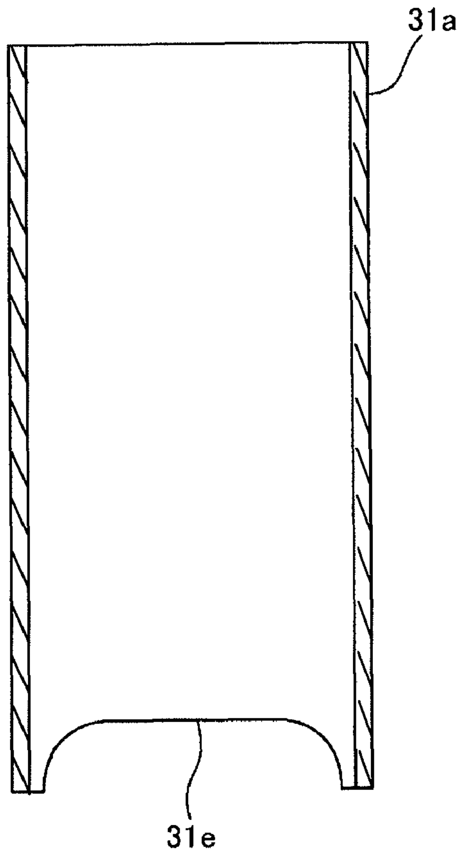
FIG. 11B is a longitudinal cross sectional view of the center liner of FIG. 11 showing a right-hand internal surface of the cylinder liner as viewed from the center axis of the cylinder.

The shape of the cylinder liner shown in FIG. 4 is merely one example, and the cylinder may, for example, be shaped as shown in FIG. 11. In other words, the position of the bottom end of the cylinder liner in the direction of the cylinder axis can be formed so as to not be constant and so that at least one part of the bottom end has different positions.

According to the illustrated embodiments, the bottom end of the piston skirt is positioned below the topmost part of the bottom end of the cylinder liner 31*a* at the time when the angle formed by the axis of the upper link 11 and the axis of the cylinder reaches a minimum, as seen from the crank axis direction. In other words, since the timing when the bottom end of the piston skirt is positioned below the topmost part of the bottom end of the cylinder liner 41*a* is the timing when the angle formed by the axis of the upper link 11 and the axis of the cylinder reaches a minimum as seen from the crank axis direction, deformation of the cylinder liner 41*a* can be effectively suppressed even if the bottom end position of the cylinder liner 41*a* is formed so that the positions is not constant and at least one part of the bottom end has different positions.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A multi-link engine comprising:

an engine block body including at least one cylinder with a cylinder liner formed so that a bottom end position in the direction of a cylinder axis is not constant and at least part of the bottom end has different positions;

a crankshaft including a crank pin;

a piston operatively coupled to the crankshaft to reciprocally move inside the cylinder of the engine;

an upper link rotatably connected to the piston by a piston pin;

a lower link rotatably connected to the crank pin of the crankshaft and rotatably connected to the upper link by an upper link pin; and a control link rotatably connected at one end to the lower link by a control link pin and rotatably connected at another end to the engine block body by a control shaft, the upper link having an upper link axis that forms an angle with the cylinder axis, as viewed along a crank axis direction of the crankshaft, such that the angle reaches a minimum angle when a crank angle of the engine is within a range where the bottom end of a piston skirt is positioned below a topmost part of the bottom end of the cylinder liner.

2. The multi-link engine as recited in claim 1, wherein the upper link axis is parallel with the cylinder axis, as seen from the crank axis direction, when the angle formed by the upper link axis and the cylinder axis reaches the minimum angle, as seen from the crank axis direction.

3. The multi-link engine as recited in claim 1, wherein the curvature radius of a movement locus of an axial center of the upper link pin is less in a vicinity of a bottom dead center of the piston than in the vicinity of a top dead center of the piston.

4. The multi-link engine as recited in claim 1, wherein the upper link is configured such that a distance from a first straight line to a second straight line is less than a distance from a third straight line to the second straight line, where the first straight line is orthogonal to the cylinder axis and tangent to an area in the vicinity of a top end of an elliptical axial center locus of the upper link pin;

the second straight line is orthogonal to the cylinder axis and tangent to an area in a vicinity of the bottom end of the elliptical locus; and the third straight line intersects the elliptical locus at two points, and is orthogonal to the cylinder axis, in which a distance between the two points of intersection reaches a maximum.

5. The multi-link engine as recited in claim 1, wherein an axial center of the upper link pin is positioned on or below a straight line that joins an axial center of the control link pin and an axial center of the crank pin.

6. The multi-link engine as recited in claim 1, wherein the upper link, the lower link and the control link are arranged with respect to each other such that a size of a relative maximum value of a reciprocal motion acceleration of the piston when the piston is near bottom dead center is equal to or larger than a size of a relative maximum value of a reciprocal motion acceleration of the piston when the piston is near top dead center.

7. The multi-link engine as recited in claim 1, wherein the multi-link engine is a variable compression ratio engine configured such that a compression ratio thereof can be changed in accordance with an operating condition by adjusting a position of an eccentric pin of the control shaft, with the minimum angle being set to a smaller angle at a low compression ratio than at a high compression ratio.

8. The multi-link engine as recited in claim 1, wherein the minimum angle formed between the upper link axis of the upper link and the cylinder axis occurs when the piston is at bottom dead center.

9. The multi-link engine as recited in claim 1, wherein the minimum angle formed between the upper link axis of the upper link and the cylinder axis occurs when the piston is before bottom dead center.

10. The multi-link engine as recited in claim 1, wherein the minimum angle formed between the upper link axis of the upper link and the cylinder axis occurs when the piston is after bottom dead center.

11. The multi-link engine as recited in claim 1, wherein a bottommost portion of the piston skirt is positioned below a bottommost part of the bottom end of the cylinder liner when the piston is at bottom dead center.

* * * * *